Dec. 6, 1938.  E. T. NEUBAUER  2,139,313
VALVE FOR COMPRESSORS
Filed March 14, 1938
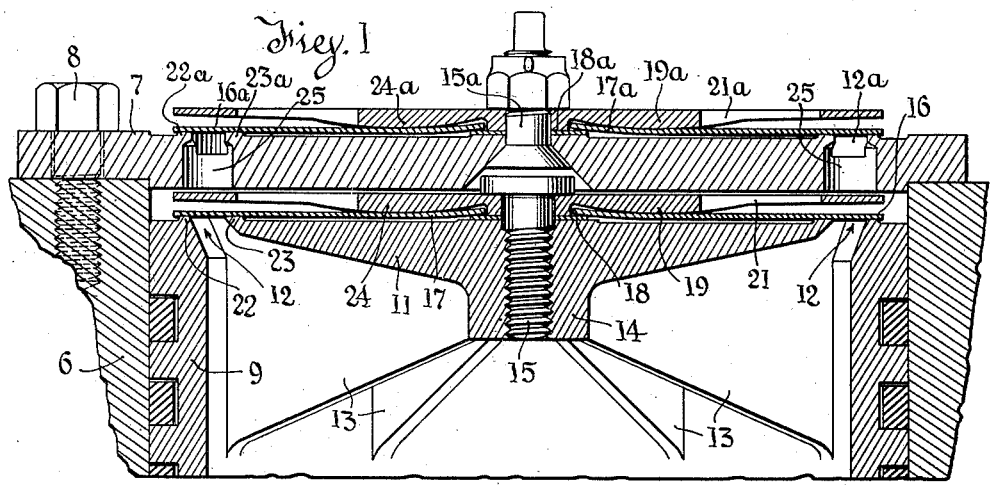
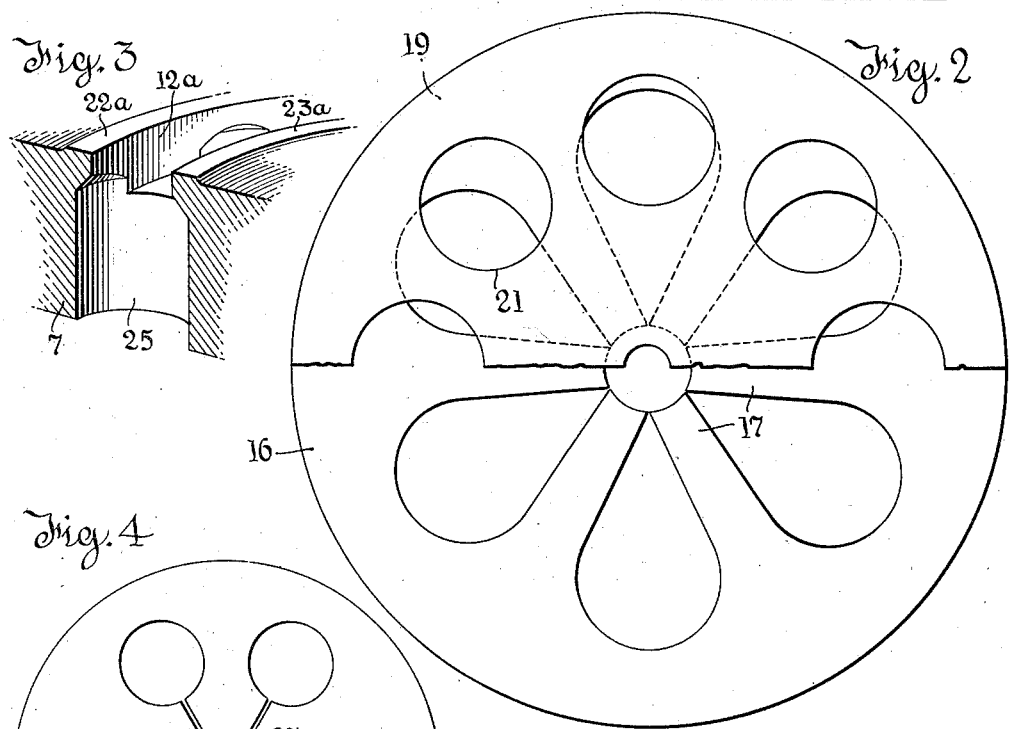
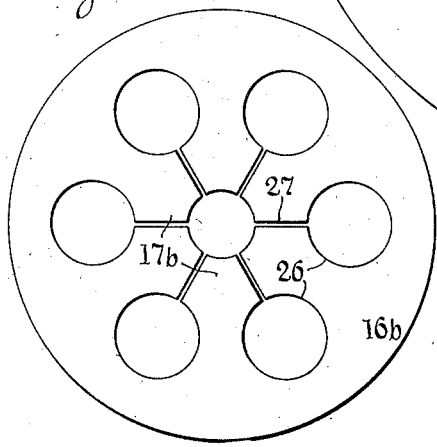
Inventor
Emil T. Neubauer
By
Dodge
Attorneys Patented Dec. 6, 1938

2,139,313

UNITED STATES PATENT OFFICE 2,139,313

VALVE FOR COMPRESSORS

Emil T. Neubauer, York, Pa., assignor to York Ice Machinery Corporation, York, Pa., a corporation of Delaware Application March 14, 1938, Serial No. 195,904

5 Claims. (Cl. 251—119)

This invention relates to automatic disc valves for compressors and the like.

In such valves, particularly suction valves, the requirements are severe, and to an extent conflicting, particularly in high speed compressors. The valve must open freely, afford large port area, seal tightly and quickly, and operate quietly. It must be light so as to avoid disturbing inertia effects, strong enough to withstand substantial closing pressures, and not subject to destructive strain (deformation) under any condition of service.

The history of flexible plate valves, i. e. valves in which the valve serves as its own seating spring, indicates by a long series of failures, that the problem is one of substantial difficulty.

The valve hereinafter disclosed has demonstrated in actual commercial service that it possesses desirable characteristics in a remarkable degree.

Generally stated the valve coacts with a continuous annular slot port and comprises a peripheral annular valve portion and inwardly extending radial fingers which are independent of each other. That is to say, there is no interconnection or hub at the center of the valve. The valve is made of a single flat plate of spring steel.

Flexure of the radial fingers is controlled, and the opening movement of the periphery of the valve disc is limited by an overlying guard. This is held in place by a central bolt (or the equivalent). The lower face of the guard is contoured to ensure even progressive flexure of the fingers, some initial flexure (in valve closed position) being secured by a raised seat on which the inner ends of the fingers rest.

In this way, remarkable operative characteristics, attributable to the harmonious and novel combination of a number of features, some of which, individually considered, are old, have been secured.

Preferred embodiments of the invention will now be described by reference to the accompanying drawing, in which:

Fig. 1 is a vertical axial section through the upper portion of the cylinder piston, and the cylinder head of a compressor equipped with inlet and discharge valves according to the invention.

Fig. 2 is a plan view of the guard (partly broken away) overlying the valve disc.

Fig. 3 is a fragmentary perspective indicating how the head ports (discharge valve ports) are formed.

Fig. 4 is a face view of a modified form of valve disc.

The cylinder 6 has a head 7, bolted in place, one bolt being indicated at 8. The piston 9 includes a head 11 with annular port 12 which port is bridged by the radial webs 13. These webs connect the piston sleeve or trunk and head 11 with one another, are deep enough to offer the necessary structural strength and terminate in a central hub 14 into which the retaining screw 15 is threaded.

The valve is a disc of spring steel, or other suitable elastic material, having a continuous marginal portion 16 and radial spokes 17 which serve to center the disc and also act as valve seating springs. The spaces between spokes are "tear shaped", i. e. they are bounded by converging lines connected by a continuous curve (shown as a circle) merging into each. This form is adopted to avoid angles with the attendant risk of the formation of cracks, as these might act as strain intensifiers. The radial fingers meet, but are not connected at their inner ends.

This form uses a straight spring arm only slightly tapered, and is suited where light spring seating pressures are desired. For example, the form is particularly desirable in connection with suction valves which should be seated rather lightly, but the form is suited for general use in automatic valves wherever the seating force, which it develops, is suited to the conditions encountered in service.

The fingers rest freely on a raised seat formed by a washer 18. The guard 19 is ported at 21 and so formed on its lower face as to flex fingers 17 downward so that they bear on washer 18 and hold rim 16 in contact with the seat ribs 22 and 23 which bound port 12. The lower face of the guard is contoured as shown at 24 to ensure gradual progressive flexure as the valve opens, and to afford clearance above the extreme inner ends of fingers 17, so that these are free and not clamped.

The bolt 15 clamps the guard 19 and washer 18 to head 11. The guard centers the valve disc.

The discharge valve mounted on head 7 is essentially the same and corresponding parts are given the same reference numerals with the letter $a$. The slot port 12$a$ is cut from the top to meet drilled ports 25 which leave bridges between them. The bolt 15$a$ replaces the machine screw 15 but is functionally identical. The valve and guard are duplicates of the inlet valve and its guard.

The modified valve disc of Fig. 4 has a rim 16$b$ essentially the same as the rim 16. The fingers 17$b$ are formed by cutting circular holes at 26 from which lead narrow radial slots 27.

The operative characteristics of the two forms of disc valve are essentially similar, but the form shown in Fig. 4 is characterized by somewhat greater spring seating pressure, and the form of Fig. 4 would be used where this characteristic is desirable, as for instance, in certain types of discharge valve. It is, however, generally available and might be used for suction valves in those cases where the seating pressure developed by flexure of the spring arms is not excessive.

The following comments apply to all the illustrated embodiments.

It will be observed that the valve disc is flat in its unstressed condition and comprises an annular rim portion which serves as the valve proper, and a plurality of generally radial spring arms which, at their inner ends, are wholly independent of each other.

It will be observed further that the washer 18 rests on a boss at the center of the head and that this boss is in plane with the two seat ribs 22 and 23. The purpose of using a separate washer is to permit the substitution of washers of different thickness for the purpose of adjusting the stress in the radial arms of the valve disc. If such adjustment is not desired then it is practicable within the scope of the invention simply to increase the height of the central boss.

Regardless of which construction is used the effect is to support the inner ends of the radial arms at a height slightly greater than the plane of the port ribs 22 and 23 so that when the arms are flexed downward by the convex lower face of the guard 19 the peripheral portion 16 of the valve ring will not be tilted or cocked in such a way as to impair the seal with either of the seat ribs.

A number of dimensional factors enter into the attainment of the desired result and no precise rule can be given, but it is practicable by trial and error to arrive at the desired result, and there is a moderate range of thickness for the washer 18, if this be used, within which range the desired result will be secured.

In any event, the raised valve seat ribs 22 and 23 in conjunction with the washer 18, or its equivalent, afford an annular recess between the valve seat and the spring seat, into which the curved portion 24 of the retainer deflects the radial arms of the valve disc to develop the desired seating tendency in the valve. The configuration of the convex portion 24 of the retainer is such as to leave the valve free to float and at the same time to ensure gradual progressive flexure of the arms 17 as the valve moves from closed to open position.

As suggested in Fig. 1, valves of the type here disclosed are suitable for use as inlet valves mounted on the piston head and as discharge valves mounted on the cylinder head of the same compressor, but obviously a compressor could be designed with inlet valves of this type located as shown or otherwise located, and might be equipped with discharge valves of a wholly different type. Similarly, a compressor might be equipped with discharge valves of this type located as shown or otherwise located, and the inlet valve might be wholly different. Furthermore, in a construction such as that shown, for example, in Fig. 1, the inlet valve disc 16 might be of the type shown in Fig. 2, whereas the discharge valve disc 16a might be of the type shown in Fig. 4. In other words, the valve is not limited in its utility to a compressor in which the inlet and discharge valve are of the same type, or even to compressors in which the valves are mounted on and are approximately coextensive with the cylinder head or the piston head as shown in Fig. 1.

This last arrangement is particularly desirable for small compressors, and the illustration in Fig. 1 is illustrative and not limiting. The scope of the invention is defined solely by the claims.

What is claimed is:—

1. A valve for compressors comprising in combination, a head member having an annular spring seat and means defining a port encircling said spring seat and spaced therefrom; a flexible disc valve having a marginal portion adapted to close said port and a series of inwardly extending radial fingers individually supported by said spring seat; and a fixed retainer for the valve having an annular convex portion bearing on the radial fingers of the valve disc between the port and said spring seat and flexing the fingers toward the head member, said retainer being formed with an annular recess opposed to said spring seat to permit flexing of the inner ends of said valve fingers toward the retainer, without interference by the retainer.

2. A valve structure for use in compressors and the like comprising in combination a seat member having a port of generally annular configuration defined by raised ribs, and an elevated spring seat member generally concentric therewith and located within the same; a disc valve which in its unstressed condition is substantially flat and includes a peripheral valve portion for coacting with the seat ribs and a plurality of substantially radial inwardly extending flexible arms free of each other at their inner ends; and a downwardly convex fixed retainer overlying said valve and serving to limit the opening movement of said peripheral portion and ensure gradual flexure of said radial arms, said retainer centering said valve element with the radial arms flexed downwardly into the interval between the spring seat and ribs to develop a seating tendency on the peripheral portion of the valve disc, the inner ends of said radial arms resting upon said spring seat portion and being free to move thereon.

3. The combination defined in claim 1 in which the spring seat member takes the form of an interchangeable washer whose thickness determines the stress imposed on the radial arms by said retainer.

4. The combination defined in claim 1 in which the radial arms of the valve disc are bounded by two approximately radial lines connected at their outer ends by a continuous curve which merges into each whereby sudden changes of cross-section and the formation of strain intensifying cracks are avoided.

5. A valve structure for use in compressors and the like comprising in combination a seat member having a port of generally annular configuration terminating in a plane seating surface and a central spring seat substantially concentric with said port and offset from the plane of said seating surface; a disc valve which in its unstressed condition is substantially flat and includes a peripheral valve portion for coacting with said seating surface and a plurality of inwardly extending radial arms free of each other at their inner ends which engage said spring seat; and a downwardly convex fixed retainer overlying said valve, said retainer serving to center the valve, limit the opening movement of its peripheral portion and ensure gradual flexure of said radial arms, the parts being so dimensioned that the arms are flexed downwardly between said seating surface and said spring seat when the valve is closed and the valve seats evenly on said plane seating surface under the stress exerted by said flexed radial arms.

EMIL T. NEUBAUER.